United States Patent
Schubert

(10) Patent No.: US 12,261,337 B2
(45) Date of Patent: Mar. 25, 2025

(54) AQUEOUS ELECTROLYTE, REDOX FLOW BATTERY AND USE THEREOF

(71) Applicant: Friedrich-Schiller-Universitaet Jena, Jena (DE)

(72) Inventor: Ulrich Sigmar Schubert, Jena (DE)

(73) Assignee: FRIEDRICH-SCHILLER-UNIVERSITAET JENA, Jena (DE)

( * ) Notice: Subject to any disclaimer, the term of this patent is extended or adjusted under 35 U.S.C. 154(b) by 447 days.

(21) Appl. No.: 17/297,763

(22) PCT Filed: Nov. 27, 2019

(86) PCT No.: PCT/EP2019/000323
§ 371 (c)(1),
(2) Date: Jul. 23, 2021

(87) PCT Pub. No.: WO2020/108787
PCT Pub. Date: Jun. 4, 2020

(65) Prior Publication Data
US 2022/0052371 A1 Feb. 17, 2022

(30) Foreign Application Priority Data

Nov. 29, 2018 (DE) .................. 10 2018 009 362.0

(51) Int. Cl.
*H01M 8/18* (2006.01)
*H01M 4/38* (2006.01)
*H01M 4/60* (2006.01)

(52) U.S. Cl.
CPC ............. *H01M 8/188* (2013.01); *H01M 4/38* (2013.01); *H01M 4/60* (2013.01); *H01M 2300/0005* (2013.01)

(58) Field of Classification Search
CPC .......... H01M 8/188; H01M 4/38; H01M 4/60; H01M 2300/0005
See application file for complete search history.

(56) References Cited

U.S. PATENT DOCUMENTS

| | | | |
|---|---|---|---|
| 2012/0077067 A1* | 3/2012 | Li | H01M 8/184 429/107 |
| 2014/0239906 A1* | 8/2014 | Anderson | H02J 7/0068 429/105 |
| 2016/0208030 A1* | 7/2016 | Gavvalapalli | H01M 8/20 |
| 2016/0344056 A1* | 11/2016 | Kniajanski | C25D 17/10 |
| 2018/0072669 A1* | 3/2018 | Liu | H01M 8/188 |

FOREIGN PATENT DOCUMENTS

WO  WO 20140267  *  2/2014
WO  2018032003 A1  2/2018

OTHER PUBLICATIONS

Ho et al., JACS, 2017, 1391207 (Year: 2017).*
Bo Hu et al. "Long-Cycling Aqueous Organic Redox Flow Battery (AORFB) toward Sustainable and Safe Energy Storage" Journal of the American Chemical Society, US, vol. 139, No. 3, Jan. 12, 2017 (Jan. 12, 2017) pp. 1207-1214.
Feng Pan and Quing Wang, "Redox Species of Redox Flow Batteries: A Review" in Molecules 2015, 20, 20499-20517.
Winsberg et al. in Angew. Chem. 2017, 36, 686-711.
M.-A. Goulet, M. J. Aziz, J. Electrochem. Soc. 2018, 165, A1466-A1477.
K. Chanawanno, C. Holstrom, L. A. Crandall, H. Dodge, V. N. Nemykin, R. S. Herrick, C. J. Ziegler, Dalton Trans. 2016, 45, 14320.
ACS Energy Lett. 2017, 2, 639-644.

* cited by examiner

*Primary Examiner* — Alexander Usyatinsky
(74) *Attorney, Agent, or Firm* — Abel Schillinger, LLP

(57) ABSTRACT

An aqueous electrolyte solution can comprise a redox-active compound, wherein the redox-active compound is a functionalized ferrocene containing solubility-facilitating groups attached to a cyclopentadienyl ring via spacers, the spacers having two to four carbon atoms.
The electrolyte solution may be used in redox flow batteries and is characterized by high stability of the redox active compound at elevated temperatures of 30° C. or above.

21 Claims, No Drawings

AQUEOUS ELECTROLYTE, REDOX FLOW BATTERY AND USE THEREOF

The invention relates to an aqueous electrolyte and a redox flow battery containing said aqueous electrolyte. Redox flow batteries, also known as redox flux batteries (hereinafter also "RFB") are used to store electrical energy based on electrochemical redox reactions. A redox flow battery contains one chamber or two polarity-specific chambers (half cells) separated by a membrane, filled with a liquid and fed by pumps from one or more separate tanks of any size. The respective liquid contains water in which redox-active substances and an inorganic or organic salt (conducting additives) are dissolved. The conducting additive can also be redox-active itself.

Due to their excellent scalability, RFB are particularly suitable as stationary energy storage systems for various performance and capacity requirements. For example, as buffer systems for renewable energies, both in the private (e.g. single- or multi-family homes), as well as industrial sector (e.g. wind and solar power plants). They thus have great potential for ensuring power grid stability and for decentralized energy supply. But mobile applications (electric cars, trucks or ships) are also conceivable.

Existing RFB are electrochemical energy storage devices. The substances required to set the potential at the electrodes are liquid, dissolved or particulate redox-active species, which are transferred to their respective other redox stage during the charging or discharging process in an electrochemical reactor. For this purpose, electrolyte solutions (catholyte, anolyte) are taken from a tank and actively pumped to the electrodes. The anode and cathode compartments are separated in the reactor by a semi-permeable membrane, which usually exhibits high selectivity for protons. As long as electrolyte solution is pumped, current can be drawn. The charging process is then simply the reverse of the process. Thus, the amount of energy that can be stored in an RFB is directly proportional to the size of the storage tanks. The power that can be extracted, on the other hand, is a function of the size of the electrochemical reactor.

RFB have a complex system technology that corresponds roughly to that of a fuel cell. Typical sizes of the individual reactors range from about 2 to 50 kW. The reactors can be combined very easily in a modular fashion, and the tank size can also be adapted almost arbitrarily.

A wide variety of redox-active chemical compounds have already been proposed for use in accumulators or batteries, such as RFB. An overview of the state of the art can be found, for example, in an article by Feng Pan and Quing Wang, "Redox Species of Redox Flow Batteries: A Review" in Molecules 2015, 20, 20499-20517 or in an article by Winsberg et al. in Angew. Chem. 2017, 36, 686-711. According to this RFB containing ferrocene as a catholyte are already known.

Ferrocene, bis($\eta^5$-cyclopentadienyl)iron(II), [Fe($\eta^5$-$C_5H_5$)$_2$] is a yellow-orange colored compound, readily soluble in organic solvents and sparingly soluble in water. Ferrocene is the parent compound and one of the most important representatives of the metallocenes and can be prepared, for example, by reacting iron(II) chloride with cyclopentadienyl sodium. Due to its aromatic character, ferrocene is amenable to electrophilic substitutions and can thus be functionalized in a variety of ways. For use in aqueous electrolytes, ferrocene must be functionalized by the incorporation of polar groups. An overview of the many possibilities for functionalizing ferrocene is given in the dissertation by A. Salmon entitled "Synthesis and electrochemistry of functional ferrocenyl and multiferrocenyl compounds," Bielefeld (2001).

RFB containing functionalized ferrocenes in the electrolyte are also known from WO 2018/032003 A1 and from US 2018/0072669 A1.

So far, RFB have mainly been used at room temperature in the literature. In the scientific literature, there is little evidence of studies at elevated temperatures, e.g. from 40 to 50° C., and no systematic studies on the behavior of aqueous electrolytes containing ferrocene (derivative)s at elevated temperatures. Commercial vanadium RFB (hereinafter also referred to as "V-RFB") are known to cause problems at temperatures above 40° C. because the electrolytes irreversibly precipitate.

Therefore, V-RFB are limited in their application temperature or elaborate cooling is required. Special applications, e.g. as a replacement for diesel generators on Indian cell phone towers, are thus denied to V-RFB. Special HCl-containing electrolytes have been developed for V-RFB, which are more temperature-stable and thus allow temperatures above 40° C., and in some cases up to approx. 50 to 60° C. (cf. US 2012/0077067 A1). However, these electrolytes are extremely corrosive. Other RFB systems have not yet been described at these comparatively high temperatures.

In particular, RFB containing organic redox-active compounds have not yet been used at these high temperatures. This is complicated by the fact that many electrolytes containing organic redox-active compounds are not stable at elevated temperatures. In this context, it should also be noted that the stability of many organic redox-active materials even at room temperature has been misjudged so far (M.-A. Goulet, M. J. Aziz, J. Electrochem. Soc. 2018, 165, A1466-A1477). Simple charge/discharge tests performed so far do not provide any information about an aging behavior of the electrolytes. Thus, the RFB containing N,N,N-2,2,6,6-heptamethylpiperidinyloxy-4-ammonium chloride (TEMPTMA) as an organic redox-active compound, described as the most stable so far, is also affected by these decomposition processes. At elevated temperatures, the side reactions are further accelerated and lead to a rapid loss of RFB capacity.

Functionalized ferrocene derivatives have now been found that surprisingly exhibit high stability at elevated temperatures. These redox-active compounds permit the preparation of aqueous electrolyte solutions that are stable at elevated temperatures. In addition, these redox-active compounds permit the preparation of RFB that can be operated at elevated temperatures. Higher temperatures of the electrolyte may occur during operation of the RFB in environments with elevated temperatures, for example, during operation in tropical or subtropical areas, and/or also during storage of electrolyte solutions at elevated temperatures and/or also during throughput of high power during charge/discharge operation in the electrode compartments.

It has been found that ferrocenes functionalized with solubility-facilitating groups attached to a cyclopentadienyl ring via spacers with two to four carbon atoms can achieve the desired combination of water solubility with sufficient temperature stability. It has further been shown that ferrocenes with direct substitution of the cyclopentadienyl ring with solubility-facilitating groups or with a C1 spacer do not exhibit the desired stability.

By using the electrolytes according to the invention, RFB with organic redox-active compounds become accessible for a "high temperature" application. In this manner, new fields of application for RFB can be opened up without the need for additional cooling.

The invention is based on the objective of providing an aqueous electrolyte containing redox-active ferrocene derivatives which exhibit sufficient stability for the operation of batteries or accumulators even at elevated temperatures.

A further objective of the present invention is to provide a redox flow battery which can be operated at elevated temperatures without the electrolyte used undergoing significant decomposition.

This objective is solved by providing the aqueous electrolyte solution described in claim 1.

The present invention is related to an aqueous electrolyte solution having a temperature of at least 30° C. comprising a compound with at least one redox-active residue of formula (I)

$$(X-C_5H_4)Fe(Y-C_5H_3-Z) \quad (I),$$

wherein X is a residue of formula $-(C_nH_{2n})$-FG or of formula $-(C_nH_{2n})$-Sp-$(C_nH_{2n})$-FG or of formula $-(C_nH_{2n})$-Brgp-, Y is hydrogen or a residue of formula $-(C_nH_{2n})$-FG or of formula $-(C_nH_{2n})$-Sp-$(C_nH_{2n})$-FG, Z is hydrogen or a covalent bond, which links the residue of formula (I) with the remainder of the molecule, FG is a functional group selected from $-OH$, $-SH$, $-NO_3$, $-NO_2$, $-CN$, $-OR_1$, $-SR_1$, $-(O-CH_2-CH_2)_o-OR_2$, $-(O-CH_2-CH_2)_o-NR_3R_4R_5^+$ $(An^{m-})_{1/m}$, $-COR_2$, $-COO^-$ $(Kat^{m+})_{1/m}$, $-COOR_2$, $-SO_3^-$ $(Kat^{m+})_{1/m}$, $-SO_3R_2$, $-SO_4^-$ $(Kat^{m+})_{1/m}$, $-SO_4R_2$, $-PO_4^{2-}$ $(Kat^{m+})_{2/m}$, $-PO_4(R_2)_2$, $-PO_3^{2-}$ $(Kat^{m+})_{2/m}$, $-PO_3(R_2)_2$, $-NR_3R_4R_5^+$ $(An^{m-})_{1/m}$-N$^+$ $R_3R_4-C_tH_{2t}-SO_3^-$ or $-NR_2-SO_2-R_3$, Brgp is a divalent bridging group which links the residue of formula (I) with the remainder of the molecule, Sp is $-O-$, $-S-$, $-SO-$ or $-SO_2-$, $R_1$ is C1-$C_4$ alkyl, preferably methyl, $R_2$ is hydrogen or $C_1$-$C_4$ alkyl, preferably hydrogen or methyl, and especially hydrogen, $R_3$, $R_4$ and $R_5$ independently of one another represent hydrogen or alkyl, preferably $C_1$-$C_4$ alkyl, and especially methyl, ethyl, propyl or butyl, Kat is an m-valent inorganic or organic cation, An is an m-valent inorganic or organic anion, m is an integer between 1 and 4, n represents an integer between 2 and 4, t is an integer between 2 and 5, and o is an integer from 1 to 50, preferably from 3 to 20.

The redox-active compounds used in the electrolyte solution according to the invention may be low-molecular-weight organic molecules, oligomers or polymers. These molecules may be dissolved in the electrolyte solution or may be present as particles dispersed or suspended, for example as dispersions, microgels or as nanogels. The redox-active compounds contain at least one radical of the formula (I) in which Z denotes hydrogen or which is linked to the remainder of the molecule via the covalent bond Z.

Preferably, the redox-active compounds containing the radical of the formula (I) used in the electrolyte solution according to the invention are water-soluble. However, they may also be compounds which are dispersible in water.

Water solubility of a compound is understood in the context of this description to mean a solubility of at least 1 g of the compound in 1 L of water at 25° C.

In the context of this description, low-molecular-weight molecules are understood to mean compounds which have no recurring structural units derived from monomers and which contain at least one, preferably one to six, particularly preferred one to four, especially one to three and very particularly preferred one or two radicals of the formula (I).

In the context of this description, oligomeric molecules are compounds which have two to ten recurring structural units derived from monomers, each of which carries a radical of the formula (I). The radicals of formula (I) may also be attached to the oligomer backbone via spacers.

In the context of this description, polymeric molecules are compounds which have more than ten, preferably eleven to fifty, recurring structural units derived from monomers, each of which carries a radical of the formula (I). The radicals of formula (I) may also be attached to the polymer backbone via spacers.

In a preferred embodiment, the electrolyte solution according to the invention contains a redox-active component with one to six, preferably one to four, in particular one to three and very preferably one to two radicals of formula (I) in the molecule.

Examples of preferably used low molecular weight, oligomeric and polymeric redox-active compounds are given below.

The molar masses of the redox-active compounds containing at least one radical of the formula (I) used in the electrolyte of the invention can vary over a wide range. Particularly preferred are redox-active compounds containing radicals of the formula (I) whose molecular weights are in the range from 150 to 80,000 g/mol, preferably in the range from 250 to 50,000 g/mol and very preferably in the range from 500 to 20,000 g/mol.

The viscosity of the electrolyte used according to the invention is typically in the range from 1 mPas up to $10^3$ mPas, in particular preferably 1 to $10^2$ mPas and most preferably 1 to 20 mPas (measured at 25° C. with a rotational viscometer, plate/plate).

The redox-active compounds used according to the invention are characterized by the presence of at least one group X on at least one cyclopentadienyl ring. Group X consists of an alkylene group with two to four carbon atoms as spacer and a solubility-facilitating group FG, or of an alkylene-oxide-alkylene group with two to four carbon atoms as spacer and a solubility-facilitating group FG, or of an alkylene-sulfide-alkylene group with two to four carbon atoms as spacer and a solubility-facilitating group FG, or of an alkylene spacer with a divalent bridging group Brgp which connects the radical of formula (I) to the remainder of the molecule.

The bridging group Sp is oxygen, sulfur or $-SO-$ or $-SO_2-$, in particular $-O-$.

The alkylene spacer may be a radical of the formula $-CH_2-CH(CH_3)-$, $-(CH_2)_3-$, $-(CH_2)_4-$ or in particular $-(CH_2)_2-$.

The alkylene oxide alkylene spacer may be a radical of the formula $-CH_2-CH(CH_3)-O-CH_2-CH(CH_3)-$, $-(CH_2)_3-O-(CH_2)_3-$, $-(CH_2)_4-O-(CH_2)_4-$ or in particular $-(CH_2)_2-O-(CH_2)_2-$.

The alkylene sulfide alkylene spacer may be a radical of the formula $-CH_2-CH(CH_3)-S-CH_2-CH(CH_3)-$, $-(CH_2)_3-S-(CH_2)_3-$, $-(CH_2)_4-S-(CH_2)_4-$ or in particular $-(CH_2)_2-S-(CH_2)_2-$.

The FG group has been described in detail above.

The divalent bridging group Brgp may be any divalent radical linking the radical of formula (I) to the remainder of the molecule, for example to a polymer backbone. Examples of bridging groups Brgp are alkylene, —O—, —S—, —SO—, —SO$_2$—, —CO—, —CO—O—, —NR$_2$—, —CO—NR$_2$— and SO$_2$NR$_2$.

In addition to the group X, the radicals of the formula (I) in the redox-active compounds used according to the invention can contain a further radical of the formula —(C$_n$H$_{2n}$)-FG or of the formula —(C$_n$H$_{2n}$)-Sp-(C$_n$H$_{2n}$)-FG (radical Y) on a cyclopentadienyl ring. Y is, however, preferably hydrogen.

The electrolyte solution according to the invention contains water or water and an organic solvent as well as the above-mentioned redox-active compound(s) and optionally other substances dissolved therein. These substances serve to balance the charge during charging or discharging of the battery or have a positive influence on the stability or performance parameters of the battery. Substances responsible for charge equalization are called conducting additives or conducting salts, and substances that have a positive effect on stability or performance parameters are called auxiliary additives.

Examples of electrolyte solvents include water or mixtures of water with alcohols (e.g., ethanol), carbonic acid esters (e.g., propylene carbonate), nitriles (e.g., acetonitrile), amides (e.g., dimethylformamide, dimethylacetamide), sulfoxides (e.g., dimethyl sulfoxide), ketones (e.g., acetone), lactones (e.g. gamma-butyrolactone), lactams (e.g. N-methyl-2-pyrrolidone), nitro compounds (e.g. nitromethane), ethers (e.g. tetrahydrofuran), chlorinated hydrocarbons (e.g. dichloromethane), carboxylic acids (e.g. formic acid, acetic acid), mineral acids (e.g. sulfuric acid, hydrogen halides or halogen hydracids). Preferred are water or mixtures of water with carbonic acid esters (e.g. propylene carbonate) or with nitriles (e.g. acetonitrile). Water is particularly preferred.

The conductive additives are usually organic or inorganic salts. Examples are salts containing anions selected from the group consisting of halide ions (fluoride ion, chloride ion, bromide ion, iodide ion), hydroxide ions, anions of inorganic acids (e.g. phosphate ions, sulfate ions, nitrate ions, hexafluorophosphate ions, tetrafluoroborate ions, perchlorate ions, chlorate ions, hexafluoroantimonate ions, hexafluoroarsenate ions, cyanide ions) or anions of organic acids (e.g. acetate ions, formate ions, trifluoroacetic acid ions, trifluoromethanesulfonate ions, pentafluoroethanesulfonate ions, nonafluorobutanesulfonate ions, butyrate ions, citrate ions, fumarate ions, glutarate ions, lactate ions, malate ions, malonate ions, oxalate ions, pyruvate ions, tartrate ions). Particularly preferred are chloride and fluoride ions, hydroxide ions, phosphate ions, sulfate ions, perchlorate ions, hexafluorophosphate ions and tetrafluoroborate ions; as well as cations selected from the group of hydrogen ions (H$^+$), alkali or alkaline earth metal cations (e.g. lithium, sodium, potassium, magnesium, calcium), zinc, iron, and substituted or unsubstituted ammonium cations (e.g. tetrabutylammonium, tetramethylammonium, tetraethylammonium), wherein the substituents may generally be alkyl groups. Hydrogen ions, lithium ions, sodium ions, potassium ions, tetrabutylammonium ions and mixtures thereof are particularly preferred. In particular, the conducting salts: NaCl, KCl, LiPF$_6$, LiBF$_4$, NaBF$_4$, NaPF$_6$, NaClO$_4$, NaOH, KOH, Na$_3$PO$_4$, K$_3$PO$_4$, Na$_2$SO$_4$, NaSO$_3$CF$_3$, LiSO$_3$CF$_3$, (CH$_3$)$_4$NOH, n-Bu$_4$NOH, (CH$_3$)$_4$NCl, n-Bu$_4$NCl, (CH$_3$)$_4$NBr, n-Bu$_4$NBr, n-Bu$_4$NPF$_6$, n-Bu$_4$NBF$_4$, n-Bu$_4$NClO$_4$, NH$_4$Cl and mixtures thereof, wherein n-Bu represents the n-butyl group Particularly preferred electrolyte solutions according to the invention contain a conductive additive comprising anions selected from the group of halide ions, hydroxide ions, phosphate ions, sulfate ions, perchlorate ions, hexafluorophosphate ions or tetrafluoroborate ions, in particular a conductive additive composed of these anions and cations selected from the group of hydrogen ions, alkali metal or alkaline earth metal cations, and substituted or unsubstituted ammonium cations.

Examples of auxiliary additives are surfactants, viscosity modifiers, pesticides, buffers, stabilizers, catalysts, conductive additives, antifreeze agents, temperature stabilizers and/or foam breakers.

Surfactants can be nonionic, anionic, cationic or amphoteric. Nonionic surfactants (e.g. polyalkylene glycol ethers, fatty alcohol propoxylates, alkyl glucosides, alkyl polyglucosides, octylphenol ethoxylates, nonylphenol ethoxylates, saponins, phospholipids) are particularly preferred.

Examples of buffers include carbonic acid bicarbonate buffer, carbonic acid silicate buffer, acetic acid acetate buffer, phosphate buffer, ammonia buffer, citric acid buffer or citrate buffer, tris(hydroxymethyl)aminomethane, 4-(2-hydroxyethyl)-1-piperazineethanesulfonic acid, 4-(2-hydroxyethyl)piperazine-1-propanesulfonic acid, 2-(N-morpholino)ethanesulfonic acid, barbital acetate buffer).

The electrolyte solutions according to the invention have an elevated temperature. This can occur when the electrolyte solution is used in certain areas of the battery or accumulator, for example only in the electrode chambers during charging and/or discharging processes and/or when the electrolyte solution is stored in external storage tanks.

Aqueous electrolyte solutions with a temperature of 30 to 90° C., preferably 30 to 50° C. and in particular 40 to 50° C., are preferred.

Furthermore, aqueous electrolyte solutions containing at least one conducting salt are preferred.

Particularly preferred are aqueous electrolyte solutions containing at least one conducting salt, in particular those salts contained in highly concentrated salt solutions (brines).

Particularly preferred the concentration of the conducting salts in the aqueous electrolyte solutions according to the invention is between 14% by weight up to the saturation limit. Saturated salt solutions are frequently used, with some of the salts being present in precipitated form.

Particularly preferred electrolyte solutions according to the invention have a charge state of less than 90%, in particular of up to 80% and very preferred of 70 to 80%. These electrolyte solutions are characterized by particularly good temperature stability of the redox-active compound containing at least one radical of the formula (I) in the electrolyte. Of course, electrolyte solutions with a charge state of 100% are also possible.

The charge state (SOC) is a characteristic value for the state of charge of the electrolyte solution or a battery containing this electrolyte solution. The value for the charge state indicates the still available capacity of an electrolyte solution or a battery in relation to the nominal value. The charge state is specified as a percentage of the fully charged state.

The charge state can be determined, for example, by the open-circuit voltage (VOC). The open-circuit voltage here depends on the state of charge; this increases with increasing state of charge. The cell voltage is measured in the "open circuit", i.e. it is the cell voltage that results at a given state of charge without external load.

Also preferred are aqueous electrolyte solutions containing a compound with at least one redox-active radical of the formula (I), where Y is hydrogen and m is 1 or 2.

Further preferred are aqueous electrolyte solutions containing a compound with at least one redox-active radical of formula (I), wherein FG is a functional group selected from $-(O-CH_2-CH_2)_o-OR_2$, $-COR_2$, $-COO^-$ $(Kat^{m+})_{1/m}$, $-SO_3^-$ $(Kat^{m+})_{1/m}$, $-SO_4^-$ $(Kat^{m+})_{1/m}$, $-PO_4^{2-}$ $(Kat^{m+})_{2/m}$, $-PO_3^{2-}$ $(Kat^{m+})_{2/m}$ or $-NR_3R_4R_5^+$ $(An^{m-})_{1/m}$.

Preferred cations Kat are hydrogen cations, alkali metal cations, alkaline earth metal cations or ammonium cations, in particular hydrogen cations, sodium, potassium, magnesium or calcium cations, or quaternary ammonium cations.

Preferred anions An are selected from the group of halide ions, hydroxide ions, phosphate ions, sulfate ions, perchlorate ions, hexafluorophosphate ions or tetrafluoroborate ions.

Particularly preferred aqueous electrolyte solutions contain a compound having at least one redox-active radical of the formula (I) in which Z is a covalent bond which connects the radical of the formula (I) to a polymer backbone selected from the group consisting of polymethacrylates, polyacrylates, polystyrenes, polyalkylene glycols, polyalkylene imines or polyvinyl ethers, the polymer backbone preferably having from 5 to 100 groups of the formula (I).

Very particularly preferred aqueous electrolyte solutions contain oligomers or polymers with recurring structural units of the formula (II) and optionally with further structural units derived from solubility-facilitating comonomers

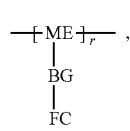

(II)

wherein
ME is a recurring structural unit derived from a polymerisable monomer,
BG is a covalent bond or a bridging group,
FC represents a residue of formula $(X-C_5H_4)$ Fe $(Y-C_5H_3-Z)$,
X, Y and Z have the meanings defined above, and
r is an integer from 2 to 150, preferably from 2 to 80 and especially preferred from 8 to 40.

The recurring units ME and BG form the backbone of the oligomer or polymer, which contains several units of the redox-active unit of formula (I) defined above.

Examples of groups of substances which can form the backbone of the oligomer or polymer are polymers derived from ethylenically unsaturated carboxylic acids or their esters or amides, such as polymethacrylate, polyacrylate, polymethacrylamide or polyacrylamide, polymers derived from ethylenically unsaturated aryl compounds, such as polystyrene, polymers derived from vinyl esters of saturated carboxylic acids or their derivatives, such as polyvinyl acetate or polyvinyl alcohol, polymers derived from olefins or from bi- or polycyclic olefins, such as polyethylene, polypropylene or polynorbornene, polyimides derived from imide-forming tetracarboxylic acids and diamines, polymers derived from naturally occurring polymers and their chemically modified derivatives, such as cellulose or cellulose ethers, and polyurethanes, polyvinyl ethers, polythiophenes, polyacetylene, polyalkylene glycols and derivatives thereof, such as ethers thereof, for example polyethylene glycol or polyethylene glycol methyl ether, poly-7-oxa-norbornene, polysiloxanes, or polyalkylene imines and derivatives thereof, such as amines thereof, for example polyethylene imines or N,N,N',N'-tetramethyl-polyethylene imines.

The following are examples of combinations of the structural units ME and the bridging groups BG for some of the above classes of substances. These are polymethacrylate  BG = —COO—

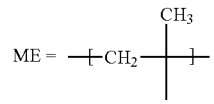

polyacrylate  BG = —COO—  ME = —(CH$_2$—CH)— polymethacrylamide  BE = —CONH—

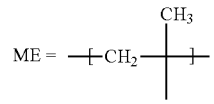

polyacrylamide  BE = —CONH—

ME = —(CH$_2$—CH)— polystyrene  BG = covalent C-C-bond or
—CH$_2$— or —NH—

polyvinylacetate  BG = covalent C-C-bond

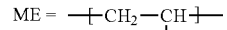

polyethylene  BG = covalent C-C-bond

ME = —(CH$_2$—CH)— polypropylene  BG = covalent C-C-bond

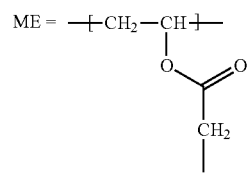

polyvinylether  BG = —O—  ME = —(CH$_2$—CH)— polyethylenimine  BG = covalent N-C-bond

ME = —(CH$_2$—CH$_2$—N)—

Particularly preferred groups of substances which form the backbone of the oligomer or polymer are polymethacrylates, polyacrylates, polymethacrylamides, polyacrylamides, polystyrene, polyethyleneimines and polyvinyl ethers.

The redox-active units of formula (I) are covalently bonded to the polymer backbone.

The polymers containing redox-active components may be linear polymers or they may be comb and star polymers, dendrimers, ladder polymers, ring-shaped polymers, polycatenanes and polyrotaxanes.

Preferably, comb and star polymers, dendrimers, ladder polymers, ring-shaped polymers, polycatenanes and polyrotaxanes are used. These types are characterized by increased solubility and the viscosity of the solutions obtained is usually lower than for corresponding linear polymers.

The solubility of the polymers containing redox-active components used according to the invention can be further improved by co-polymerization or functionalization, e.g. with ethylene glycol, methacrylic acid, acrylic acid or styrene sulfonate.

Preferred solubility-facilitating comonomers are vinyl alcohol, vinyl acetate, methyl vinyl ether, methacrylic acid, acrylic acid, methacrylic acid alkyl ester, acrylic acid ethyl ester, methacrylic acid amide, acrylic acid amide, vinyl sulfonate, vinyl phosphonic acid or styrene sulfonate.

The preparation of the redox-active compounds used according to the invention can be carried out by conventional methods. Oligomers and polymers can be prepared by the usual polymerization processes. Examples include polymerization in substance, polymerization in solution or emulsion or suspension polymerization. These procedures are known to the person skilled in the art.

Low molecular weight compounds containing one or more radicals of formula (I) typically have the following structure

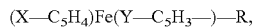

(X—$C_5H_4$)Fe(Y—$C_5H_3$—)—R, wherein X and Y have the meanings defined above and R is hydrogen or a mono- or polyvalent organic radical which may optionally contain further (X—$C_5H_4$) Fe (Y—$C_5H_3$)- radicals.

Very particularly preferred aqueous electrolyte solutions contain, as redox-active compound, a compound of the formula (II)

(X—$C_5H_4$)Fe(Y—$C_5H_4$)    (II), wherein X and Y are as defined above,

Other very particularly preferred aqueous electrolyte solutions contain, as redox-active compound, a compound of the formula (III)

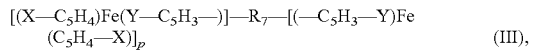

[(X—$C_5H_4$)Fe(Y—$C_5H_3$—)]—$R_7$—[(—$C_5H_3$—Y)Fe ($C_5H_4$—X)]$_p$    (III), wherein X and Y are as defined above, $R_7$ is a two- to four-valent organic group, and p is an integer from 1 to 4.

By $R_7$ as a two- to four-valent organic group is meant an organic residue linked to the remainder of the molecule by two, three or four covalent bonds.

Examples of divalent organic radicals include alkylene, alkyleneoxy, poly(alkyleneoxy), alkylene sulfide, poly(alkylene sulfide), alkyleneamino, poly(alkyleneamino), cycloalkylene, arylene, aralkylene, or heterocyclylene.

Alkylene groups can be either branched or unbranched. An alkylene group typically contains one to twenty carbon atoms, preferably two to four carbon atoms. Examples of alkylene groups include: methylene, ethylene, propylene and butylene. Alkylene groups may be optionally substituted, for example, with carboxylic or sulfonic acid groups, with carboxylic ester or sulfonic ester groups, with carboxylamide or sulfonic acid amide groups, with hydroxyl or amino groups, or with halogen atoms.

Alkyleneoxy and poly(alkyleneoxy) groups may contain both branched and unbranched alkylene groups. An alkylene group occurring in an alkyleneoxy or in a poly(alkyleneoxy) group typically contains two to four carbon atoms, preferably two or three carbon atoms. The number of repeating units in poly(alkyleneoxy) groups can vary over wide ranges. Typical numbers of repeat units range from 2 to 50. Examples of alkyleneoxy groups include: ethyleneoxy, propyleneoxy, and butyleneoxy. Examples of poly(alkyleneoxy) groups are: poly(ethyleneoxy), poly(propyleneoxy) and poly(butyleneoxy).

Alkyleneamino and poly(alkyleneamino) groups may contain both branched and unbranched alkylene groups. An alkylene group occurring in an alkyleneamino or in a poly(alkyleneamino) group typically contains two to four carbon atoms, preferably two or three carbon atoms. The number of repeating units in poly(alkyleneamino) groups can vary over wide ranges. Typical numbers of repeat units range from 2 to 50. Examples of alkyleneamino groups include: ethyleneamino, propyleneamino and butyleneamino. Examples of poly(alkyleneamino) groups are: poly(ethyleneamino), poly(propyleneamino) and poly(butyleneamino).

Cycloalkylene groups typically contain five, six or seven ring carbon atoms, each of which may be independently substituted. Examples of substituents include alkyl groups or two alkyl groups which, together with the ring carbons to which they are attached, can form another ring. An example of a cycloalkylene group is cyclohexylene. Cycloalkylene groups may optionally be substituted, for example, with carboxylic or sulfonic acid groups, with carboxylic ester or sulfonic ester groups, with carboxylamide or sulfonic acid amide groups, with hydroxyl or amino groups, or with halogen atoms.

Arylene groups are typically cyclic aromatic groups containing five to fourteen carbon atoms, each of which may be independently substituted. Examples of arylene groups include o-phenylene, m-phenylene, p-phenylene, o-biphenylyl, m-biphenylyl, p-biphenylyl, 1-naphthyl, 2-naphthyl, 1-anthryl, 2-anthryl, 9-anthryl, 1-phenantolyl, 2-phenantolyl, 3-phenantolyl, 4-phenantolyl, or 9-phenantolyl. Arylene groups may be optionally substituted, for example, with carboxylic or sulfonic acid groups, with carboxylic ester or sulfonic ester groups, with carboxylamide or sulfonic acid amide groups, with hydroxyl or amino groups, or with halogen atoms. Other examples of substituents include alkyl groups or two alkyl groups which, together with the ring carbon atoms to which they are attached, can form another ring.

Heterocyclylene groups are typically cyclic groups with four to ten ring carbon atoms and at least one ring heteroatom, each of which may be independently substituted. Examples of heteroatoms include oxygen, nitrogen, phosphorus, boron, selenium or sulfur. Examples of heterocyclylene groups include furandiyl, thiophendiyl, pyrroldiyl, or imidazolediyl. Heterocyclylene groups are preferably aromatic. Heterocyclyl groups may be optionally substituted, for example, with carboxyl or sulfonic acid groups, with carboxylic ester or sulfonic ester groups, with carboxylamide or sulfonic acid amide groups, with hydroxyl or amino groups, or with halogen atoms. Further examples of substituents are alkyl groups, or two alkyl groups which together with the ring carbons to which they are attached can form a further ring.

Aralkylene groups are typically aryl groups to which one or two alkyl groups are covalently bonded. Aralkyl groups may be covalently bonded to the remainder of the molecule through their aryl moiety and their alkyl moiety or through two alkyl moieties. The aralkylene group may be substituted on the aromatic ring, for example, with alkyl groups or with halogen atoms. Examples of aralkylene groups are benzylene or dimethylphenylene (xylylene).

Examples of $R_7$ as a threevalent organic radical are alkyltriyl, alkoxytriyl, tris-poly(alkyleneoxy), tris-poly(alkyleneamino), cycloalkyltriyl, aryltriyl, aralkyltriyl or heterocyclyltriyl. These radicals correspond to the divalent radicals described in detail above, with the difference that they are linked to the remainder of the molecule with three covalent bonds instead of two covalent bonds.

Examples of $R_7$ as a fourvalent organic radical are alkylquaternyl, alkoxyquaternyl, quaterpoly(alkylenoxy), quaterpoly(alkylenamino), cycloalkylquaternyl, arylquaternyl, aralkylquaternyl or heterocyclylquaternyl. These radicals correspond to the divalent radicals already described in detail above, with the difference that they are linked to the remainder of the molecule with four covalent bonds instead of two covalent bonds.

Aqueous electrolyte solutions containing a compound with at least one redox-active radical of the formula (I), where n is 2, are particularly preferred.

These compounds have a particularly favorable combination of water solubility and temperature stability. Moreover, such compounds are particularly accessible synthetically by treating the cyclopentadienyl ring of ferrocene with butyllithium and subsequently reacting it with ethylene oxide, or reacting vinyl ferrocene with thiol derivatives.

In a further embodiment, the invention relates to a first type of redox flow battery for storing electrical energy comprising a reaction cell with two electrode chambers for catholyte and anolyte, which are each connected to at least one liquid reservoir, the electrode chambers being separated by a membrane, being equipped with electrodes, and each being filled with electrolyte solutions which contain redox-active components in liquid form dissolved or dispersed in an aqueous electrolyte solvent, as well as, optionally conducting salts dissolved therein and possibly further additives. This redox flow battery is characterized in that the anolyte contains a water-soluble redox-active component and that the catholyte in the electrode chamber contains an aqueous electrolyte solution as defined above.

The electrolyte solutions in the electrode chambers may be coated with paraffine oil to minimize oxygen diffusion.

Preferred redox flow batteries of this first type also contain in the liquid reservoir(s) an aqueous electrolyte solution as defined above.

Preferred redox flow batteries of this first type are those in which the anolyte contains a compound containing one or more bipyridiyl groups in the molecule as a redox active component.

These are typically compounds containing in the molecule at least one redox-active radical of the formula (IV) or of the formula (V), preferably one to six, in particular one to four, very preferably one to three and especially preferred one to two radicals of the formula (IV) or of the formula (V) in the molecule

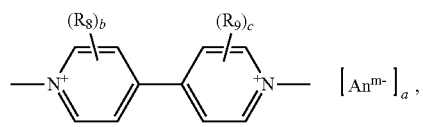
(IV)

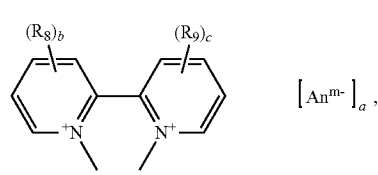
(V)

wherein the lines extending from the nitrogen atoms in the structures of formulae IV and V represent covalent bonds connecting the structures of formulae IV and V to the remainder of the molecule, $R_8$ and $R_9$ independently of one another represent alkyl, alkoxy, haloalkyl, cycloalkyl, aryl, aralkyl, heterocyclyl, halogen, hydroxy, amino, nitro or cyano, An represents an m-valent inorganic or organic anion, b and c independently of one another are integers from 0 to 4, preferably 0, 1 or 2, especially 0, m is an integer from 1 to 4, and a is a number with value 2/m.

The compounds containing one or more bipyridiyl groups in the molecule as the redox-active component may be low molecular weight organic molecules, oligomers or polymers. Preferably, these contain at least one radical of the formula (IV) or of the formula (V), which is linked to the remainder of the molecule via the covalent bond.

Preferably, the redox-active compounds containing the radical of formula (IV) or formula (V) are water-soluble. However, they may also be compounds which are dispersible in water.

Redox-active components preferably used in the anolyte are compounds of formulae IVa or Va

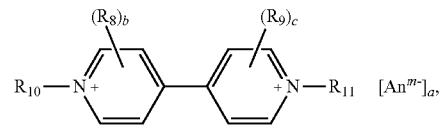
(IVa)

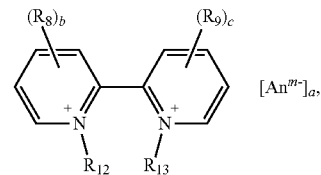
(Va)

wherein $R_8$, $R_9$, An, a, b, c and m are as defined above, $R_{10}$ and $R_{11}$ independently of one another are hydrogen, alkyl optionally substituted by a carboxylic ester, carboxylic amide, carboxylic acid, sulfonic acid or amino group, for example a 2-trialkylammonium-ethyl group, cycloalkyl optionally substituted by a carboxylic ester, carboxylic amide, carboxylic acid, sulfonic acid or amino group, aryl optionally substituted by a carboxylic ester, carboxylic amide, carboxylic acid, sulfonic acid or amino group, or aralkyl optionally substituted by a carboxylic ester, carboxylic amide, carboxylic acid, sulfonic acid or amino group, in particular $C_1$-$C_6$-alkyl, $C_1$-$C_6$-alkyl substituted by a carboxylic ester group, $C_1$-$C_6$-alkyl substituted by a carboxylic amide group, $C_1$-$C_6$-alkyl substituted by a carboxylic acid group, $C_1$-$C_6$-alkyl substituted by a sulfonic acid group, or $C_1$-$C_6$-alkyl substituted by an amino group, and very preferably propionate, isobutionate, ethyl or methyl, and $R_{12}$ and $R_{13}$ independently of one another are hydrogen, alkyl optionally substituted by a carboxylic ester, carboxylic amide, carboxylic acid, sulfonic acid or amino group, for example a 2-trialkylammonium ethyl group, cycloalkyl optionally substituted by a carboxylic ester, carboxylic amide, carboxylic acid, sulfonic acid or amino group, aryl optionally substituted by a carboxylic ester, carboxylic amide, carboxylic acid, sulfonic acid or amino group, or aralkyl optionally substituted by a carboxylic ester, carboxylic amide, carboxylic acid, sulfonic acid or amino group, or two radicals $R_{12}$ and $R_{13}$ together form a $C_1$-$C_3$-alkylene group, in particular $C_1$-$C_6$-alkyl, $C_1$-$C_6$-alkyl substituted by a carboxylic ester group, $C_1$-$C_6$-alkyl substituted by a carboxylic amide group, $C_1$-$C_6$-alkyl substituted by a carboxylic acid group, $C_1$-$C_6$-alkyl substituted by a sulfonic acid group, or $C_1$-$C_6$-alkyl substituted by an amino group, or together are ethylene, and very preferably propionate, isobutionate, ethyl or methyl, or together are ethylene.

Examples of particularly preferred compounds are N, N'-di-$C_1$-$C_4$-alkylbipyridyl cations with any anions for charge balance, for example N, N'-dimethylbipyridyl halides, such as N, N'-di-methylbipyridyl chlorides.

Preferred redox flow batteries of the first type contain as anolyte an aqueous electrolyte solution having a temperature of at least 30° C., preferably from 30 to 90° C., and in particular from 30 to 50° C., which contains a redox-active compound comprising at least one radical of the formula (IV) or of the formula (V).

In further preferred redox flow batteries of this first type, the electrode chambers for catholyte and anolyte are separated by a semipermeable membrane impermeable to the redox couple in the catholyte, and the anolyte contains zinc salt as redox-active component.

In a further embodiment, the invention also relates to a second type of redox flow battery for storing electrical energy, comprising a reaction cell with an electrode chamber for an electrolyte solution, which is connected to at least one liquid reservoir, the electrode chamber being equipped with a cathode and an anode, and being filled with electrolyte solution which contains redox-active components in liquid form dissolved or dispersed in an aqueous electrolyte solvent, as well as, optionally conductive salts dissolved therein and possibly further additives. This redox flow battery is characterized in that the electrolyte solution contains an aqueous electrolyte solution as defined above and zinc salt as a further redox-active component.

Redox flow batteries of this second type are characterized by the fact that they only need to have one liquid reservoir and that no membrane needs to be used to separate the reaction cell into anode and cathode compartments.

Preferred redox flow batteries of this second type also contain in the liquid reservoir an aqueous electrolyte solution as defined above.

Preferred redox flow batteries of this second type use a zinc solid anode with the redox pair zinc(II)/zinc(0).

Examples of zinc salts for the redox flow batteries of the first and second type are zinc chloride, zinc fluoride, zinc bromide, zinc iodide, zinc nitrate, zinc nitrite, zinc hydrogen carbonate, zinc sulfate, zinc perchlorate, zinc tetrafluoroborate and zinc hexafluorophosphate. Besides zinc salts with inorganic anions, zinc salts with organic anions can also be used, for example zinc acetate, zinc oxalate or zinc formate.

In the second type and in a preferred embodiment of the first type of redox flow battery according to the invention, zinc is used as a redox-active anode material. Particularly noteworthy are the different aggregate states that zinc can assume within the battery.

During the charging process, zinc(II) cations dissolved in the electrolyte are reduced to elemental zinc(0) on the anode surface. Two electrons must be accepted for this. The active material zinc is therefore present in the battery in both dissolved and solid form.

The zinc solid anode can be permanently present as a metallic electrode, or it can be formed in situ during the battery charging process on an electrically conductive surface inside the chamber, by the reduction of zinc cations. The zinc cations can act both primarily as the active material, but also secondarily as a conductive additive or as part of a conductive additive mixture.

During the charging process, zinc(II) cations dissolved in the electrolyte are reduced to elemental zinc(0) on the anode surface. The anode can be made of any electrically conductive material, preferably metal, in particular zinc or zinc alloys. By accepting two electrons, metallic zinc is deposited on the electrode surface. In the reverse case, metallic zinc is transferred from the electrode surface by the release of two electrons into zinc ions, which accumulate in the anolyte.

Particularly preferred redox flow batteries according to the invention have a zinc solid anode with the redox pair zinc(II)/zinc(0).

The advantage over the fully organic redox flow batteries described above is, on the one hand, the reduction in production costs. The zinc anode is much more cost-efficient to produce than known organic anodes. On the other hand, the redox pair zinc(II))/zinc(0) is characterized by very good stability against external environmental influences, such as susceptibility to oxygen. Conventional systems must be kept oxygen-free; this significantly complicates battery design and increases operating costs. With the use of a zinc anode, this can be dispensed with completely.

Zinc also has a very high overvoltage in aqueous media, allowing an extremely high potential window. The potential window is the maximum voltage (potential range) that can be reached at most between the cathode and anode due to the position of the redox pairs in the range of the electrochemical voltage series, without unwanted side reactions or decomposition of the redox-active species, the conductive additive, the electrolyte or any other component of the entire battery. Conventional aqueous flux batteries are limited to a potential window of about 1.2 V. When this is exceeded, hydrogen gas would otherwise be generated. By using a zinc anode, the potential window can be expanded to over 2 V. This leads to a considerable increase in electrical power per cell. Zinc has a very high overvoltage with respect to hydrogen, so despite the high voltage of 2 V, no hydrogen is formed at the anode and the battery can be operated safely.

The term "battery" is used in its broadest sense in the context of this description. It may refer to a single rechargeable electrochemical cell or a combination of several such electrochemical cells.

Particularly preferred redox flow batteries of the present invention have a charge state of the catholyte or of the catholyte and the anolyte of less than 90%, more particularly of up to 80% and most preferably of 70 to 80%. These redox flow batteries are characterized by particularly good temperature stability of the electrolyte and in particular of the redox-active compound containing at least one radical of the formula (I) in the electrolyte. The charge state is determined as described above. Of course, the charge state of the catholyte or of the catholyte and the anolyte in the RFB according to the invention can also be 100%.

In addition to the components described above, the redox flow battery according to the invention may contain other elements or components customary for such cells.

In the redox flow battery according to the invention, selected redox-active components are used which are present in the chamber(s) in dissolved, liquid or dispersed form.

The redox potential of the redox-active component can be determined, for example, by cyclic voltammetry. This method is known to those skilled in the art (compare Allen J. Bard and Larry R. Faulkner, "Electrochemical Methods: Fundamentals and Applications," 2001, $2^{nd}$ edition, John Wiley & Sons; Richard G. Compton, Craig E. Banks, "Understanding Voltammetry," 2010, $2^{nd}$ edition, Imperial College Press).

The first type of redox flow battery according to the invention contains a semi-permeable or microporous membrane. This fulfills the following functions
  separation of the anode and cathode compartments
  retention of the redox active component in the catholyte and in the anolyte, i.e. retention of the cathode and the anode active material
  permeability for the conducting salts of the electrolyte which serve to balance the charge, i.e. for anions and/or cations of the conducting salt or for the charge carriers contained in the electrolyte in general.

Among others, the membrane can be a size exclusion membrane, e.g. a dialysis membrane, but also an ion-selective membrane. The membrane prevents the passage of the redox active ferrocene compound into the anode compartment and the passage of the redox active components of the anolyte into the cathode compartment. The passage of dissolved zinc(II) cations need not, but can also be inhibited by the membrane.

Depending on the application, the materials of the membrane can consist of plastics, ceramics, glasses, metals or textile fabrics. Examples of materials are organic polymers such as cellulose or modified cellulose, for example cellulose ether or cellulose ester, polyethersulfone, polysulfone, polyvinylidene fluoride, polyesters, polyurethanes, polyamides, polypropylene, polyvinyl chloride, polyacrylonitrile, polystyrene, polyvinyl alcohol, polyphenylene oxide, polyimides, polytetrafluoro-ethylene and their derivatives, or furthermore ceramics, glasses or felts. Membranes consisting of several materials (composites) are also possible.

The membranes and the resulting redox flow batteries can be used in various appearances. Examples include flat membranes, pocket filter construction, and wound modules. These embodiments are known to those skilled in the art. Preferably, flat membranes are used.

The thickness of the membrane used in accordance with the invention can vary over a wide range. Typical thicknesses are in the range between 0.1 μm and 5 mm, in particular between 10 μm and 200 μm.

In addition to the redox-active components, electrolytes and, optionally membranes described above, the redox flow cell according to the invention preferably contains further components. These include
  conveying means, such as pumps, as well as tanks and tubes for the transport and storage of redox-active components
  electrodes, preferably consisting of or containing graphite, graphite fleece, graphite paper, carbon nanotube carpets, activated carbon, carbon black or graphene
  optionally current conductors, such as made from graphite or metals.

The negative electrode preferably contains zinc and may further contain, for example, the following materials: stainless steel, Hastelloy or iron-chromium-nickel containing alloys, graphite, graphite nonwoven, graphite paper, carbon nanotube carpets, activated carbon, carbon black or graphene.

The redox flow batteries according to the invention contain current conductors as a further optional but preferred component. These have the task of establishing the best possible electrical contact between electrode material and the external current source or current sink.

Aluminum, aluminum alloys, copper, stainless steel, Hastelloy, iron-chromium-nickel alloys, noble metal-coated titanium or tantalum, in particular platinum- and/or iridium- and/or ruthenium oxide-coated titanium, niobium, tantalum, hafnium or zirconium can be used as current conductors in the redox flow batteries according to the invention.

All components that enable the transfer of electrical current to the electrodes are referred to as current collectors. The redox reactions take place at the electrodes (cathode and anode), which are in direct contact with the electrolyte.

The redox flow batteries according to the invention can be used in a wide variety of fields. In the broadest sense, this may involve the storage of electrical energy for mobile and stationary applications. The invention also relates to the use of redox flow batteries for these purposes.

Examples of applications include use as stationary storage for emergency power supply, peak load balancing, as well as for intermediate storage of electrical energy from renewable energy sources, in particular in the sector of photovoltaics, hydropower and wind power, from gas, coal, biomass, tidal and marine power plants.

The redox flow batteries according to the invention can be interconnected in a serial or parallel manner in a manner known per se.

The following examples explain the invention without limiting it thereto.

EXAMPLE 1: SYNTHESIS OF FERROCENE-BIS-SULFONIC ACID

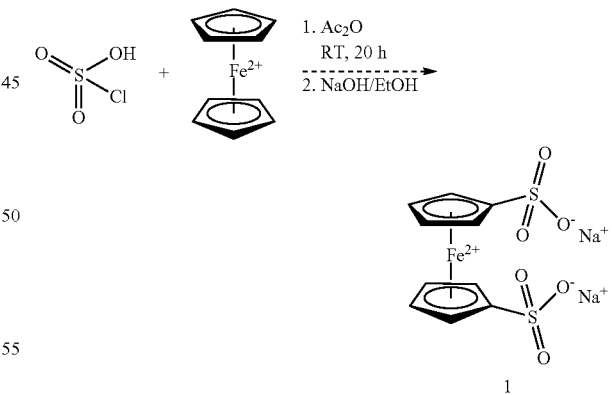

The synthesis of ferrocene-bis-sulfonic acid followed a modified literature procedure (K. Chanawanno, C. Holstrom, L. A. Crandall, H. Dodge, V. N. Nemykin, R. S. Herrick, C. J. Ziegler, Dalton Trans. 2016, 45, 14320) and is described below.

Ferrocene (8.00 g, 44 mmol) was dissolved in acetic anhydride (100 mL). Chlorosulfonic acid (5.7 mL, 86 mmol) was added slowly. The reaction mixture was stirred in an argon atmosphere for 20 hours at room temperature. The suspension was then filtered in an argon atmosphere. The filtrate was washed with acetic anhydride. Then the product was dried. One part (3.46 g, 8.5 mmol) of the dried product was dissolved in ethanol (10 mL). Then, a 1 M NaOH solution (10 mL) freshly prepared from NaOH (4.0 g, 100 mmol) in ethanol (100 mL) was slowly added. The solution was stirred for 30 min at room temperature. The precipitate was collected on a filter and then washed with ethanol and then dried in vacuo. Thus, the sodium salt of ferrocene-bis-sulfonic acid was obtained as a yellow solid (2.1 g, 4.7 mmol).

EXAMPLE 2: STABILITY TEST OF FERROCENE-BIS-SULFONIC ACID (COMPARATIVE)

The ferrocene from Example 1 was oxidized using Oxone® and the stability of the "charged" molecule was investigated. The charged electrolytes showed an irreversible precipitate after storage at 60° C. (also in the absence of air) after three days.

EXAMPLE 3: INVESTIGATION OF THE TEMPERATURE STABILITY OF ELECTROLYTE SOLUTIONS

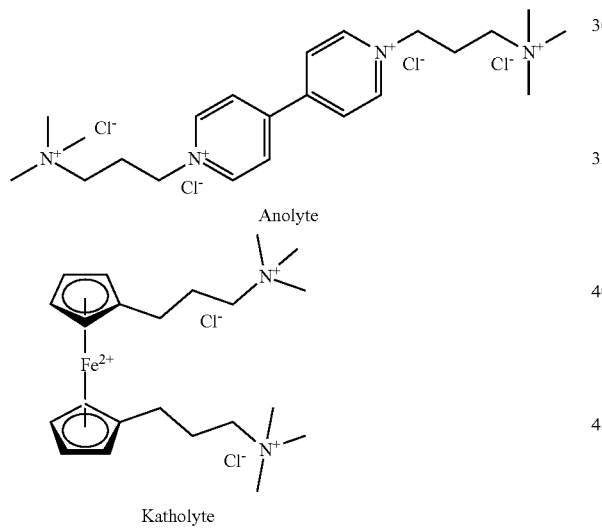

Anolyte

Katholyte

Preparation of Electrolytes:
  Catholyte: 400 mM solution of ferrocene derivative (1.77 g, 4 mmol) in deionized water (10 mL
  Anolyte: 600 mM solution of the viologen (3.00 g, 6 mmol) in deionized water (10 mL).
  Battery test: Electrolyte solutions were separated using a Fumasep FAA-3-50 anion exchange membrane with 5 cm$^2$ surface area. Graphite plates with a graphite fleece were used as electrodes. A persistaltic pump pumped the electrolyte solutions through tubing into reservoirs located in a heatable sand bath and through the half cell.

In the first three cycles, 101.1, 100.3 and 100.1 mAh could be charged. Correspondingly, 100.6, 100.5 and 100.4 mAh were discharged.

After approximately 12 days of constant cycling, 99.4, 99.3 and 99.3 mAh were charged and 99.6, 99.6 and 99.5 mAh were discharged, respectively.

The experiment was also carried out with a sand bath heated to 60° C., in which both storage tanks of the electrolytes were located. The solutions, which had been cycled for almost 19 days in the meantime, were used for this purpose. In the process, 99.0 mAh could be charged and 98.5 mAh discharged after 24 hours.

Ferrocene from Example 3 can be purchased commercially from TCI Chemicals, for example. The synthesis of this compound is described in ACS Energy Lett. 2017, 2, 639-644.

The synthesis of the viologen derivative of Example 3 is also described in ACS Energy Lett. 2017, 2, 639-644.

EXAMPLE 4: SYNTHESIS OF A FUNCTIONALISED FERROCENE

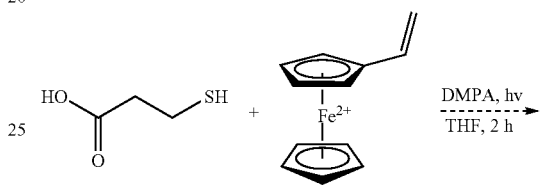

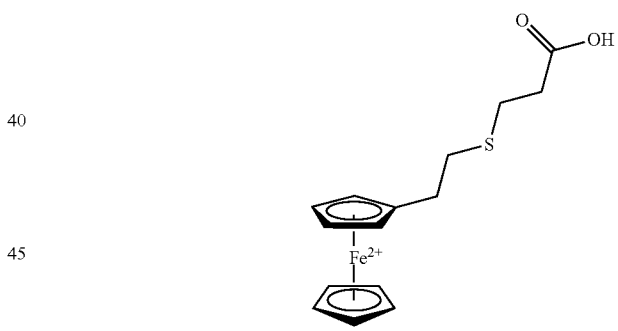

Vinylferrocene (100 mg, 0.47 mmol) was dissolved in tetrahydrofuran (2 mL) in a microwave glass (5 mL). Then, 2,2-dimethoxy-2-phenylacetophenone (DMPA, 3 mg, 0.01 mmol) was added. After a magnetic stir bar was added to the microwave tube, it was sealed with a Teflon septum and argon was passed through the clear orange solution for 15 minutes. Then 2-mercaptopropanoic acid (50 µL, 0.56 mmol) was added using a microsyringe. This solution was then placed in a beaker on a stir plate in an UV chamber (365 nm) and irradiated for 20 minutes. The solution was then given a period of 10 minutes to cool. A total of 120 minutes was irradiated. The solvent was removed and the crude product was dissolved in dichloromethane and purified by column chromatography (silica, EtOAc/hexane 2/8). After the solvent was removed by distillation, the crude product was dried under high vacuum. The product was obtained as a highly viscous orange oil.

EXAMPLE 5: SYNTHESIS OF A FERROCENE POLYMER

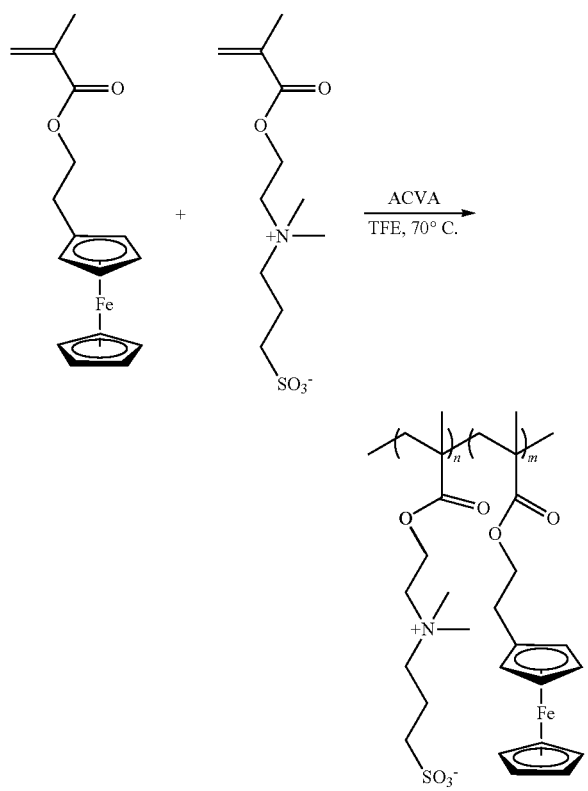

By means of a free-radical copolymerization of a ferrocene monomer and a sulfobetaine methacrylate, a ferrocene-containing copolymer could be prepared. The ferrocene monomer was obtained by reacting the hydroxyethyl ferrocene with methacrylic acid chloride.

EXAMPLE 6: SYNTHESIS OF HYDROXYETHYL FERROCENE

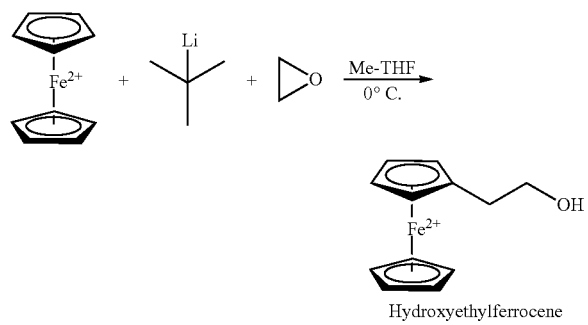

Ferrocene was dissolved in methyl-THF and reacted with tert-butyllithium. Subsequently, ethylene oxide was added. The product was subsequently obtained after column chromatographic separation.

EXAMPLE 7: SYNTHESIS OF A FERROCENE POLYMER

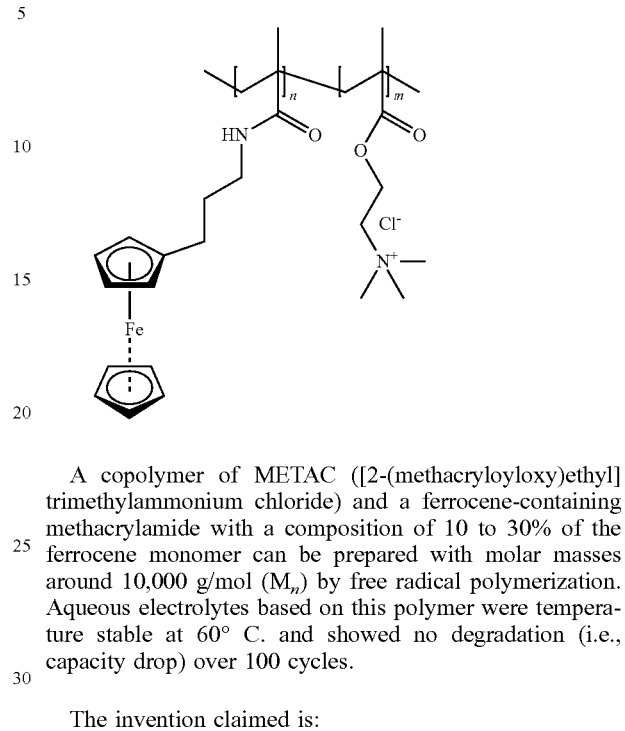

A copolymer of METAC ([2-(methacryloyloxy)ethyl] trimethylammonium chloride) and a ferrocene-containing methacrylamide with a composition of 10 to 30% of the ferrocene monomer can be prepared with molar masses around 10,000 g/mol ($M_n$) by free radical polymerization. Aqueous electrolytes based on this polymer were temperature stable at 60° C. and showed no degradation (i.e., capacity drop) over 100 cycles.

The invention claimed is:
1. An aqueous electrolyte solution comprising a redox-active compound with at least one redox-active residue of formula (I)

$$(X-C_5H_4)Fe(Y-C_5H_3-Z) \qquad (I),$$

wherein X is a residue of formula $-(C_nH_{2n})$-FG or of formula $-(C_nH_{2n})$-Sp-$(C_nH_{2n})$-FG or of formula $-(C_nH_{2n})$-Brgp-, Y is hydrogen or a residue of formula $-(C_nH_{2n})$-FG or of formula $-(C_nH_{2n})$-Sp-$(C_nH_{2n})$-FG, Z is hydrogen or a covalent bond, which links the residue of formula (I) with a remainder of the compound, FG is a functional group selected from $-OH$, $-SH$, $-NO_3$, $-NO_2$, $-CN$, $-OR_1$, $-SR_1$, $-(O-CH_2-CH_2)_o-OR_2$, $-(O-CH_2-CH_2)_o-NR_3R_4R_5^+$ $(An^{m-})_{1/m}$, $-COR_2$, $-COO^-$ $(Kat^{m+})_{1/m}$, $-COOR_2$, $-SO_3^-$ $(Kat^{m+})_{1/m}$, $-SO_3R_2$, $-SO_4^-$ $(Kat^{m+})_{1/m}$, $-SO_4R_2$, $-PO_4^{2-}$ $(Kat^{m+})_{2/m}$, $-PO_4(R_2)_2$, $-PO_3^{2-}$ $(Kat^{m+})_{2/m}$, $-PO_3(R_2)_2$, $-NR_3R_4R_5^+$ $(An^{m-})_{1/m}$-$N^+R_3R_4-C_tH_{2t}-SO_3^-$ or $-NR_2-SO_2-R_3$, Brgp is a divalent bridging group which links the residue of formula (I) with the remainder of the compound, Sp is $-O-$, $-S-$, $-SO-$ or $-SO_2-$, $R_1$ is $C_1$-$C_4$ alkyl, $R_2$ is hydrogen or $C_1$-$C_4$ alkyl, $R_3$, $R_4$ and $R_5$ independently of one another represent hydrogen or alkyl, Kat is an m-valent inorganic or an organic cation, An is an m-valent inorganic or an organic anion, m is an integer between 1 and 4, n represents an integer between 2 and 4, t is an integer between 2 and 5, and is an integer from 1 to 50, and wherein the aqueous electrolyte solution has a temperature from 30° C. to 90° C.

2. The aqueous electrolyte solution according to claim 1, wherein the aqueous electrolyte solution comprises at least one conducting salt.

3. The aqueous electrolyte solution according to claim 1, wherein the aqueous electrolyte solution is contained in a redox flow battery and has a charge state of less than 90%.

4. The aqueous electrolyte solution according to claim 1, wherein Y is hydrogen and m is 1 or 2.

5. The aqueous electrolyte solution according to claim 1, wherein FG is a functional group selected from
$(O-CH_2-CH_2)_o-OR_2$, $-COR_2$, $-COO^- (Kat^{m+})_{1/m}$, $-SO_3^- (Kat^{m+})_{1/m}$, $-SO_4^- (Kat^{m+})_{1/m}$, $-PO_4^{2-} (Kat^{m+})_{2/m}$, $-PO_3^{2-} (Kat^{m+})_{2/m}$ or $-NR_3R_4R_5^+ (An^{m-})_{1/m}$.

6. The aqueous electrolyte solution according to claim 1, wherein Kat is selected from a hydrogen cation, an alkali metal cation, an alkaline earth metal cation, an ammonium cation, or a quaternary ammonium cation.

7. The aqueous electrolyte solution according to claim 1, wherein An is selected from a halide ion, a hydroxide ion, a phosphate ion, a sulfate ion, a perchlorate ion, a hexafluorophosphate ion or a tetrafluoroborate ion.

8. The aqueous electrolyte solution according to claim 1, wherein Z is a covalent bond which connects the at least one redox-active residue of the formula (I) to a polymer backbone selected from the group of polymethacrylates, polyacrylates, polystyrenes, polyalkylene glycols, polyalkylene imines or polyvinyl ethers, and wherein the polymer backbone includes 5 to 100 residues of the formula (I).

9. The aqueous electrolyte solution according to claim 1, wherein the aqueous electrolyte solution comprises oligomers or polymers with recurring structural units of the formula (II) and optionally further structural units derived from solubility-facilitating comonomers

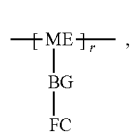
(II)

wherein
ME is a recurring structural unit derived from a polymerizable monomer,
BG is a covalent bond or a bridging group,
FC represents a residue of formula $(X-C_5H_4)F(Y-C_5H_3-Z)$,
X, Y and Z have the meanings defined in claim 1, and
r is an integer from 2 to 150.

10. The aqueous electrolyte solution according to claim 1, wherein the redox-active compound is a compound of formula (II)

$(X-C_5H_4)Fe(Y-C_5H_4)$ (II), wherein X and Y have the meaning defined in claim 1.

11. The aqueous electrolyte solution according to claim 1, wherein the redox-active compound is a compound of formula (III)

$[(X-C_5H_4)Fe(Y-C_5H_3-)]-R_7-[(-C_5H_3-Y)Fe(C_5H_4-X)]_p$ (III), wherein X and Y have the meaning defined in claim 1,
$R_7$ is a two-to four-valent organic group, and
p represents an integer from 1 to 4.

12. The aqueous electrolyte solution according to claim 1, wherein n is 2.

13. A redox flow battery for storing electrical energy comprising a reaction cell with two electrode chambers for a catholyte and an anolyte, which are each connected to at least one liquid reservoir, the two electrode chambers being separated by a membrane, being equipped with electrodes, and each being filled with electrolyte solutions which contain redox-active components in liquid form dissolved or dispersed in an aqueous electrolyte solvent, as well as, optionally comprising conducting salts dissolved therein, and wherein the redox flow battery is characterized in that the anolyte contains a water-soluble redox-active component and that the catholyte in the electrode chamber contains the aqueous electrolyte solution according to claim 1.

14. The redox flow battery according to claim 13, wherein the redox-active component of the anolyte contains a compound comprising one or more bipyridiyl groups.

15. The redox flow battery according to claim 13, wherein the electrode chambers for catholyte and anolyte are separated by a semipermeable membrane impermeable to the redox couple in the catholyte, and the redox-active component of the anolyte contains a zinc salt.

16. A redox flow battery for storing electrical energy, comprising a reaction cell with an electrode chamber for an electrolyte solution, which is connected to at least one liquid reservoir, the electrode chamber being equipped with a cathode and an anode, and the electrode chamber being filled with the aqueous electrolyte solution of claim 1, wherein the aqueous electrolyte solution further comprises a zinc salt as a further redox-active component.

17. The redox flow battery according to claim 13, wherein the redox flow battery comprises a zinc solid anode with a redox pair zinc (II)/zinc (0).

18. The redox flow battery according to claim 13, wherein a charge state of the catholyte or of the catholyte and the anolyte is less than 90%.

19. The redox flow battery according to claim 13, wherein the redox flow battery is adapted for a storage of electrical energy for mobile and stationary applications, wherein the storage includes stationary storage for emergency power supply, for peak load balancing, or for intermediate storage of electrical energy from renewable energy sources.

20. The aqueous electrolyte solution of claim 1, wherein the aqueous electrolyte solution has a temperature of at least 40° C.

21. A redox flow battery comprising the aqueous electrolyte solution according to claim 1, wherein the redox-active compound is a compound of formula (II)

$(X-C_5H_4)Fe(Y-C_5H_4)$ (II), wherein X and Y have the meaning defined in claim 1.

* * * * *